(No Model.)

E. HAUCK.
HOLDER FOR TROUSERS.

No. 364,346.  Patented June 7, 1887.

Witnesses:

Inventor:
Edward Hauck

UNITED STATES PATENT OFFICE.

EDUARD HAUCK, OF FRANKFORT-ON-THE-MAIN, GERMANY.

HOLDER FOR TROUSERS.

SPECIFICATION forming part of Letters Patent No. 364,346, dated June 7, 1887.

Application filed February 24, 1887. Serial No. 228,721. (No model.)

*To all whom it may concern:*

Be it known that I, EDUARD HAUCK, a subject of the Emperor of Germany, residing at Frankfort-on-the-Main, Germany, have invented new and useful Improvements in Holders for Trousers or other Like Garments, of which the following is a specification.

A holder for trousers and other garments, constructed according to my invention, consists of a clamp, one member of which is a frame having a loop on one of its longer sides for suspending it, and having one of its shorter sides formed as a pivot and the other of said shorter sides provided with a hook, and the other member is a substantially-straight bar having on one end a socket to receive the pivot on the first-mentioned member and form a hinge, and the other end of which engages with the hook on the first-mentioned member.

Figure 1:
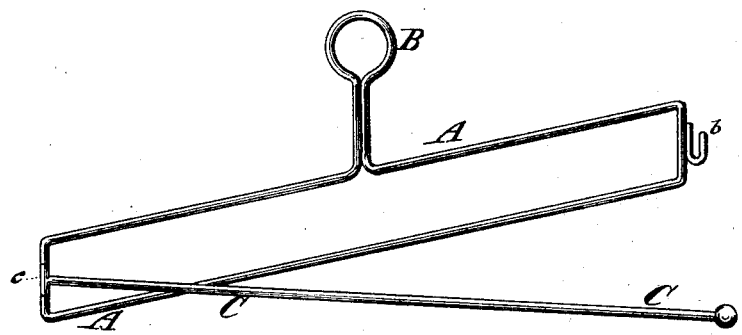
Figure 2:
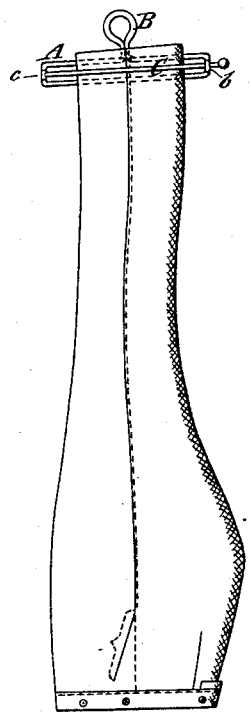

Figure 1 is a perspective view of a holder constructed according to my invention; and Fig. 2 is a front view of the holder, a pair of trousers held therein and suspended therefrom.

A designates the frame, which may be made of bent wire, sheet metal, or any suitable material, and provided with a loop, B, on one of its longer sides, by which to suspend it, having one of its shorter sides or ends—viz., that to the left of the figures—formed as a pivot, and the other of said shorter sides or ends provided with a hook, b, which projects from one face.

C designates the bar, which may be of the same material as the frame B. The said bar is a little longer than said frame and is furnished at one end with a socket, c, which receives within it the pivotal short side or end of the frame B, and hinges the frame and bar together in such manner that the bar, while retained firmly at its hinged end, may by its elasticity permit the other end to be moved in and out of the hook b, and retain the said end in the hook when it is placed therein.

To apply the holder to a garment, the free end of the bar is removed from the hook and swung aside on the hinge, as shown in Fig. 1, and the parts of the garment to be held—as the bottoms of a pair of trousers—are placed between the frame and bar. The bar is then brought up as close as possible to the frame and spring, over the hook b, wherein it retains itself as long as may be desired, while the holder, with the garment securely held in proper shape, is suspended by the loop or eye B.

What I claim as my invention, and desire to secure by Letters Patent, is—

The holder for trousers or garments, consisting of the combination of the frame A, having on one of its longer sides a loop, B, one of its shorter sides formed as a pivot and the other provided with a hook, b, and the substantially-straight bar C, having a socket, c, at one end, by which it is hinged to the pivotal end of the frame, and the other end of which engages with the hook b on the frame, all substantially as herein described.

In testimony whereof I have signed my name to this specification in the presence of two subscribing witnesses.

EDUARD HAUCK.

Witnesses:
 FRANZ WIRTH,
 FRANZ HASSLACHER.